US007077697B2

(12) United States Patent
Kooiman

(10) Patent No.: US 7,077,697 B2
(45) Date of Patent: Jul. 18, 2006

(54) SNAP-IN FLOAT-MOUNT ELECTRICAL CONNECTOR

(75) Inventor: John A. Kooiman, Peoria, AZ (US)

(73) Assignee: Corning Gilbert Inc., Glendale, AZ (US)

( * ) Notice: Subject to any disclaimer, the term of this patent is extended or adjusted under 35 U.S.C. 154(b) by 0 days.

(21) Appl. No.: 10/938,910

(22) Filed: Sep. 9, 2004

(65) Prior Publication Data

US 2006/0051997 A1 Mar. 9, 2006

(51) Int. Cl.
*H02B 1/01* (2006.01)

(52) U.S. Cl. ........................................ 439/557; 439/247

(58) Field of Classification Search ................ 439/246, 439/247, 248, 180, 557, 558, 700, 745
See application file for complete search history.

(56) References Cited

U.S. PATENT DOCUMENTS

| | | | | |
|---|---|---|---|---|
| 4,580,862 | A | 4/1986 | Johnson | 339/64 R |
| 4,697,859 | A | 10/1987 | Fisher, Jr. | 439/246 |
| 4,789,351 | A | 12/1988 | Fisher, Jr. et al. | 439/248 |
| 5,456,611 | A | 10/1995 | Henry et al. | 439/180 |
| 5,516,303 | A | 5/1996 | Yohn et al. | 439/248 |
| 5,769,652 | A | 6/1998 | Wider | 439/248 |
| 5,944,548 | A | 8/1999 | Saito | 439/248 |
| 5,980,290 | A | 11/1999 | Meynier et al. | 439/246 |
| 6,343,958 | B1 | 2/2002 | Wayman | 439/700 |
| 6,409,550 | B1 | 6/2002 | Splichal et al. | 439/701 |
| 6,558,177 | B1 | 5/2003 | Havener et al. | 439/246 |
| 6,592,387 | B1 | 7/2003 | Komenda et al. | 439/247 |
| 6,679,726 | B1 | 1/2004 | Tunn et al. | 439/565 |
| 6,699,054 | B1 | 3/2004 | Critelli | 439/248 |
| 6,705,875 | B1 | 3/2004 | Berghorn et al. | 439/63 |

*Primary Examiner*—Khiem Nguyen
(74) *Attorney, Agent, or Firm*—Joseph M. Homa; Marvin A. Glazer

(57) ABSTRACT

An electrical connector (800) for mounting in a mounting hole includes a body (804) and a mounting mechanism. The mounting mechanism includes a spring finger basket (806) that includes a base portion (808) and a plurality of spring fingers (809). Each spring finger (821–826) is commonly connected at the base portion and has a tip (812) at a free end opposite the base portion. The base portion is attached to an outer surface of the body adjacent to a flange (805) in the outer surface. The tip of each spring finger is spaced apart from the body. An end cap (818) is attached to the outer surface of the body. The end cap has an outer lip (819) limiting outward radial movement and permitting inward radial movement of the tip of each spring finger during radial movement of the body with respect to the mounting mechanism. A coil spring (404) is attached to the outer surface of the body. A shroud (827) is attached to the body adjacent to a front side of the coil spring. The mounting mechanism permits simultaneous radial and axial movement of the body relative to the mounting mechanism.

31 Claims, 13 Drawing Sheets

800

806

SNAP-IN FLOAT-MOUNT ELECTRICAL CONNECTOR

BACKGROUND OF THE INVENTION

1. Field of the Invention

This invention relates to electrical connectors, and more particularly to an electrical connector having a push-on style interface, which can be snapped into a mounting hole of a panel and which has axially floating contacts.

2. Description of the Related Art

Coaxial cable connectors having a mounting configuration commonly known as "snap-in, float-mount" are used with push-on style interfaces such as a subminiature push-on ("SMP") interface and a SMP-miniature ("SMPM") interface, as described in MIL-STD-348A. A snap-in connector must easily and reliably snap into a mounting hole of a panel and lock itself in the mounting hole. A snap-in mechanism holds the connector body axially aligned so that it will be in a correct position to mate with a mating connector. The snap-in function of known prior art connectors is accomplished by one of several different mechanisms. A snap-in, float-mount connector has a front end for mating with the mating connector and a back end for connecting with a coaxial cable. A central portion of the snap-in, float-mount connector floats axially back (to the right in the Figures). A snap-in, float-mount mechanism allows the connector to be mounted to a panel by snapping the connector into a mounting hole, and, thereafter, allows a central portion of the connector to float axially in order to take up tolerance differences when a plurality of such connectors—each mounted in separate mounting holes of a single panel—are nearly simultaneously mated to a plurality of mating connectors. The float-mount function of known prior art connectors is usually accomplished by a compression coil spring.

FIGS. 1–3 show a first prior art connector 100 that utilizes a C-shaped retaining ring 101 mounted in a groove 102 in a ferrule 103 to achieve the snap-in function. FIG. 1 shows a perspective view of the first prior art connector 100. FIGS. 2 and 3 are cross-sectional views of the first prior art connector 100 through cut-line 2—2. The cross-sectional views of the first prior art connector 100 are simplified in that the internal components are not shown. FIG. 2 shows the first prior art connector 100 with a C-shaped retaining ring in a proper position. When operating as intended, the C-shaped retaining ring 101 closes as the first prior art connector 100 is pushed into a mounting hole in a panel (such as the panel 701 shown in FIG. 7) to allow it to slide through the mounting hole. After insertion, the C-shaped retaining ring 101 snaps open and locks the ferrule 103 into the mounting hole. Disadvantageously, it is easy for the relatively flimsy C-shaped retaining ring 101 to become out of proper position. FIG. 3 shows a first way that the C-shaped retaining ring 101 can be out of proper position. In FIG. 3, the dislodged C-shaped retaining ring 101 is out of the groove 102 and moved rearwardly. The first prior art connector 100 cannot be installed if the C-shaped retaining ring 101 is in the position shown in FIG. 3. FIG. 3A shows a second way that the C-shaped retaining ring 101 can be out of proper position. In FIG. 3A, the C-shaped retaining ring 101 is at the groove 102, but is moved down within the groove, and is no longer centered on the first prior art connector 100. When the C-shaped retaining ring 101 is in the position shown in FIG. 3A, the first prior art connector 100 cannot easily be installed by hand. When the C-shaped retaining ring 101 is in the position shown in FIG. 3A, a tool must be used to install the first prior art connector 100. The tool is needed to produce a greater force required overcome the obstruction caused by a portion of C-shaped retaining ring 101 protruding from the groove 102. Before installing the first prior art connector 100 by hand, the C-shaped retaining ring must be first properly re-positioned to the position shown in FIG. 2, also by using a tool. Another disadvantage of the first prior art connector 100 is that the C-shaped retaining ring 101 is mechanically weak and may degrade the reliability of the snap-in function.

FIGS. 4–7 show a second prior art connector 400 that utilizes a prior art spring finger basket 401 with a washer 402 to achieve the snap-in function. FIG. 4 shows a perspective view of the second prior art connector 400. The prior art spring finger basket 401 includes a plurality of prior art spring fingers 403. FIGS. 5–7 are cross-sectional views of the second prior art connector 400 through cut-line 5—5. The cross-sectional views of the second prior art connector 400 are simplified by not showing the internal components. FIG. 5 shows the second prior art connector 400 with the washer 402 in a proper position. FIG. 6 shows the washer 402 disadvantageously out of proper position. The washer 402 can be pushed down inside the spring finger basket 401 by the force of a coil spring 404, which disadvantageously locks the plurality of prior art spring fingers 403 open and renders the snap-in mechanism inoperable. Under the loading from the coil spring 404, it is relatively easy for the washer 402 to be disadvantageously pushed rearwardly and moved under the prior art spring finger basket 401, as shown in FIG. 6, instead of being at the tips of the prior art spring fingers 403, as the washer should be, as shown in FIG. 5. If the washer is pushed down into the prior art spring finger basket 401 prior to installation in the panel 701, the second prior art connector 400 cannot be installed. Furthermore, if the washer is pushed into the prior art spring finger basket 401 subsequent to installation, the second prior art connector 400 cannot be uninstalled. Disadvantageously, with the second prior art connector 400, axial alignment with a mating connector is not always present. FIG. 7 shows the second prior art connector 400 and a portion of a panel 701 into which it is mounted, and shows that the second prior art connector is not perpendicular to the panel, and, therefore, the axis of the second prior art connector would likely not be co-linear with the axis of a mating connector (not shown). The mounting mechanism of the second prior art connector 400 allows the second prior art connector to easily become misaligned. The second prior art connector 400 lacks any means for maintaining its axis perpendicular with the panel 701, which is required when a plurality of such connectors are mated. The second prior art connector 400 also lacks a provision to reliably return its axis perpendicular to the panel 701 after having been displaced from the perpendicular. Another disadvantage of the second prior art connector 400 is that the prior art spring fingers 403 are straight, which concentrates all the internal stress at the base of each finger and which can lead to stress cracking and/or fingers breaking off.

OBJECTS OF THE INVENTION

It is therefore an object of the present invention to provide a connector that overcomes the disadvantages of the prior art, and which avoids use of components that can easily move out of proper position prior to installation of the connector into a mounting hole.

It is another object of the present invention to provide a connector that can be installed without using a tool.

It is still another object of the present invention to provide a connector that is more rugged and reliable than prior art connectors.

It is yet another object of the present invention to provide a mounting mechanism for a connector, which permits both radial and axial movement of the connector relative to the mounting mechanism.

It is a further object of the present invention to provide a mounting mechanism for a connector that urges radial re-alignment of the mounting mechanism with the connector after the connector has been moved out of radial alignment with the mounting mechanism.

These and other objects of the present invention will become apparent to persons skilled in the art as the description thereof proceeds.

SUMMARY OF THE INVENTION

Briefly described, and in accordance with a preferred embodiment thereof, the present invention relates to an electrical connector for mounting in a mounting hole, which includes a body and a mounting mechanism attached to the body. The mounting mechanism includes a spring finger basket that includes a base portion and a plurality of spring fingers. Each spring finger has a back end commonly connected at the base portion and a free front end opposite the base portion. The base portion is attached to an outer surface of the body adjacent to a flange in the outer surface. The free front end of each spring finger is spaced apart from the body. An end cap is attached to the body. A back side of the end cap is adjacent to the free front end of each spring finger. The end cap has a backward-extending outer lip limiting outward radial movement and permitting inward radial movement of the free front end of each spring finger during radial movement of the body with respect to the mounting mechanism. A spring is attached to the body. A back side of the spring is adjacent to a front side of the end cap. A shroud is attached to the body adjacent to a front side of the spring.

The present invention also relates to a mounting mechanism for mounting a body of an electrical connector in a mounting hole, which includes a spring finger basket that includes a base portion and a plurality of spring fingers. Each spring finger has a back end commonly connected at the base portion and a tip at a front end opposite the base portion. The base portion is attached to an outer surface of the body adjacent to a flange in the outer surface. The tip of each spring finger is spaced apart from the body. An end cap is attached to the body. A back side of the end cap is adjacent to the free front end of each spring finger. The end cap has a backward-extending outer lip limiting outward radial movement and permitting inward radial movement of the tip of each spring finger during radial movement of the body with respect to the mounting mechanism. A spring is attached to the body. A back side of the spring is adjacent to a front side of the end cap. A shroud is attached to the body adjacent to a front side of the spring.

The present invention further relates to an electrical connector for mounting in a mounting hole, which includes a body and a mounting mechanism attached to the body. The mounting mechanism includes a spring finger basket that includes a base portion and a plurality of spring fingers. Each spring finger has a back end commonly connected at the base portion and has a tip at a front end opposite the base portion. The base portion is attached to an outer surface of the body adjacent to a flange in the outer surface. The tip of each spring finger is spaced apart from the body. An end cap is attached to the body. A back side of the end cap is adjacent to the tip of each spring finger. The end cap has a backward-extending outer lip defining an annular space bounded by an inner surface of the outer lip, a back surface of the end cap and the outer surface of the body, within which the tips of the spring fingers are free to move radially. A spring is attached to the body. A back side of the spring is adjacent to a front side of the end cap. A shroud is attached to the body adjacent to a front side of the spring.

Other aspects, features and advantages of the present invention will become apparent to persons skilled in the art from the following detailed description and the accompanying drawings.

BRIEF DESCRIPTION OF THE DRAWINGS

The present invention will be described with greater specificity and clarity with reference to the following drawings, in which.

Figure 1:
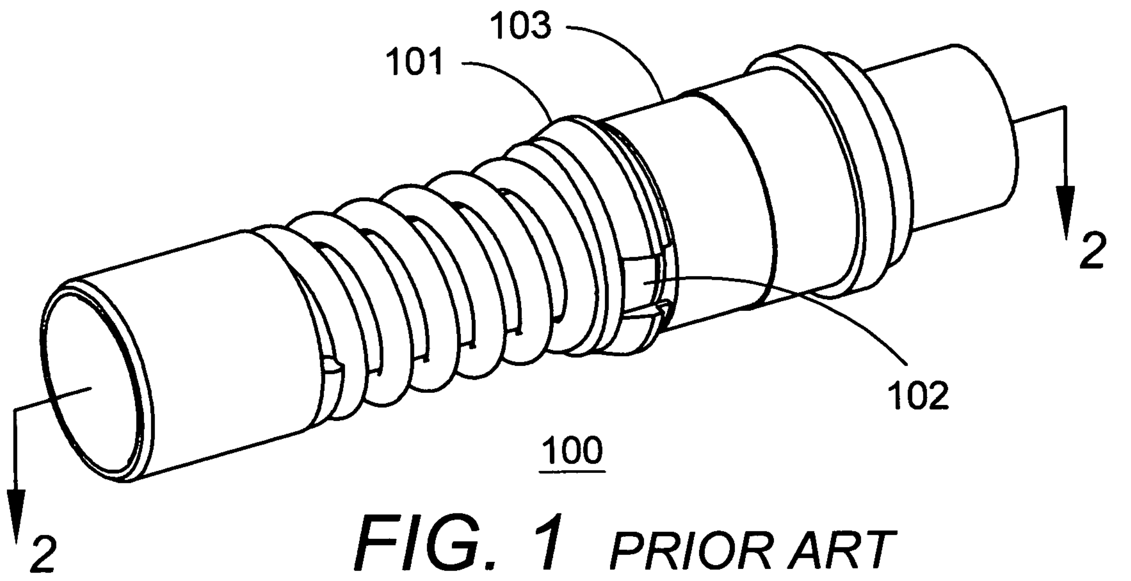
FIG. 1 PRIOR ART
FIG. 1 is a perspective view of a first prior art connector.
Figure 2:
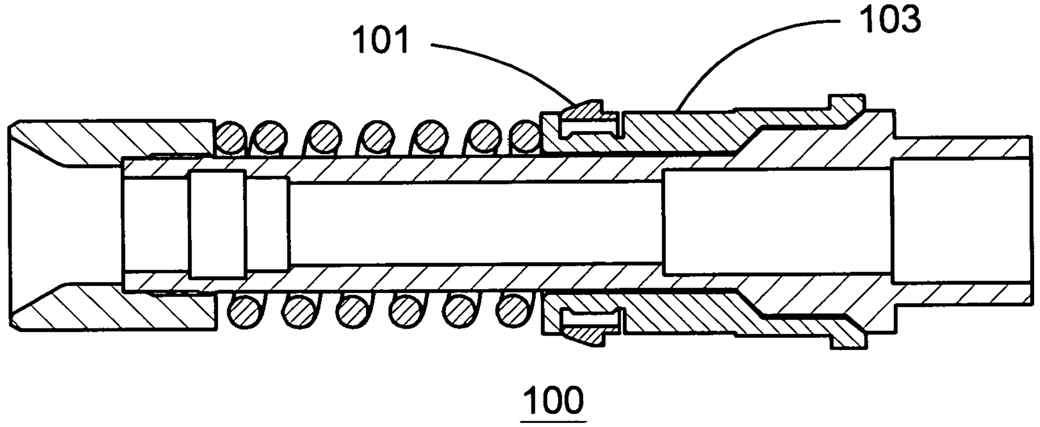
FIG. 2 PRIOR ART
FIG. 2 is a cross-sectional view through cut-line 2—2 of the first prior art connector of FIG. 1, showing a C-shaped retaining ring in position.
Figure 3:
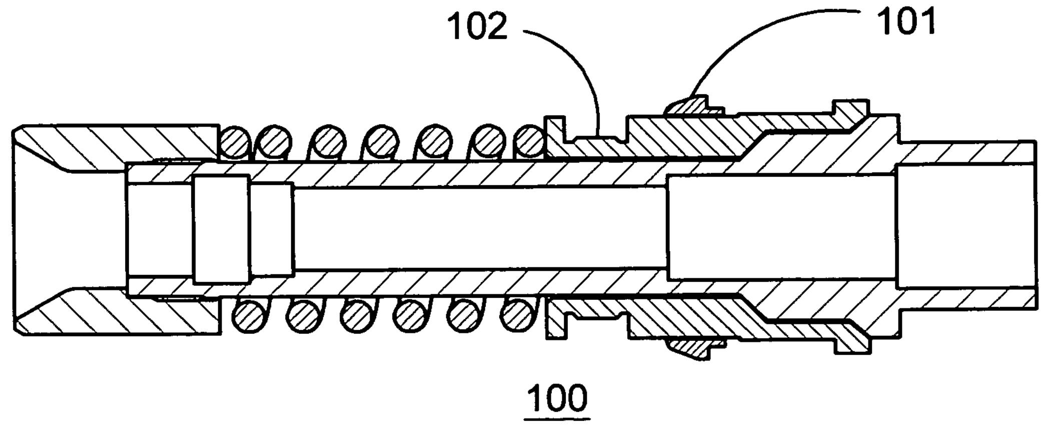
FIG. 3 PRIOR ART
FIG. 3 is a cross-sectional view through cut-line 2—2 of the first prior art connector of FIG. 1, showing the C-shaped retaining ring out of position in a first way.
Figure 3A:
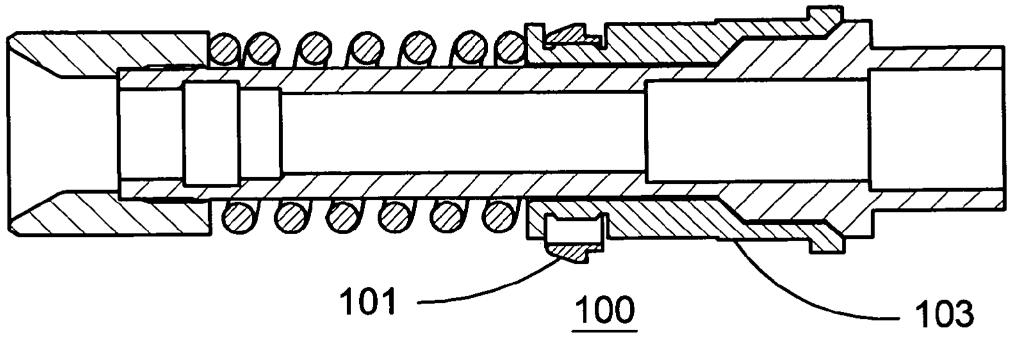
FIG. 3A PRIOR ART
FIG. 3A is a cross-sectional view through cut-line 2—2 of the first prior art connector of FIG. 1, showing the C-shaped retaining ring out of position in a second way.
Figure 4:
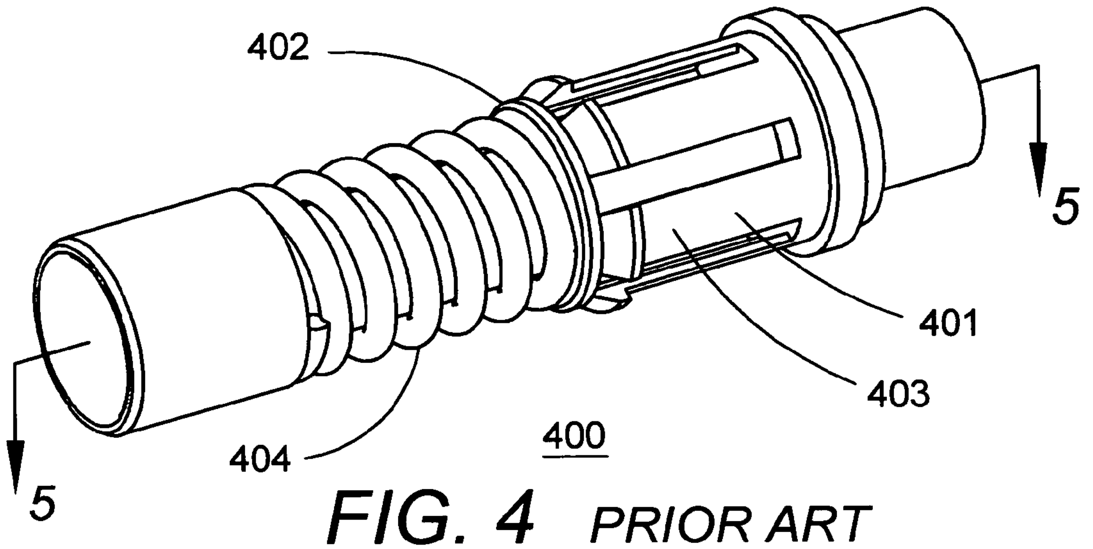
FIG. 4 PRIOR ART
FIG. 4 is a perspective view of a second prior art connector.
Figure 5:
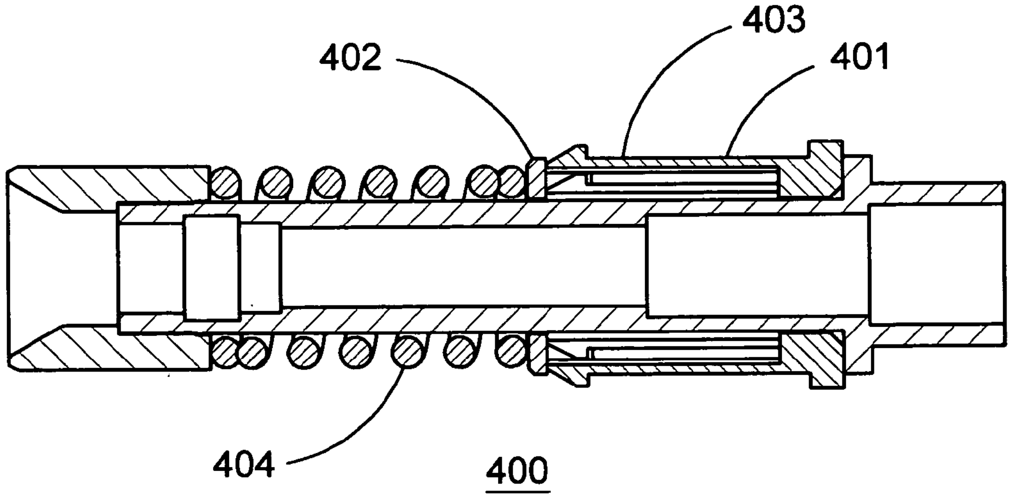
FIG. 5 PRIOR ART
FIG. 5 is a cross-sectional view through cut-line 5—5 of the second prior art connector of FIG. 4, showing a washer in position.
Figure 6:
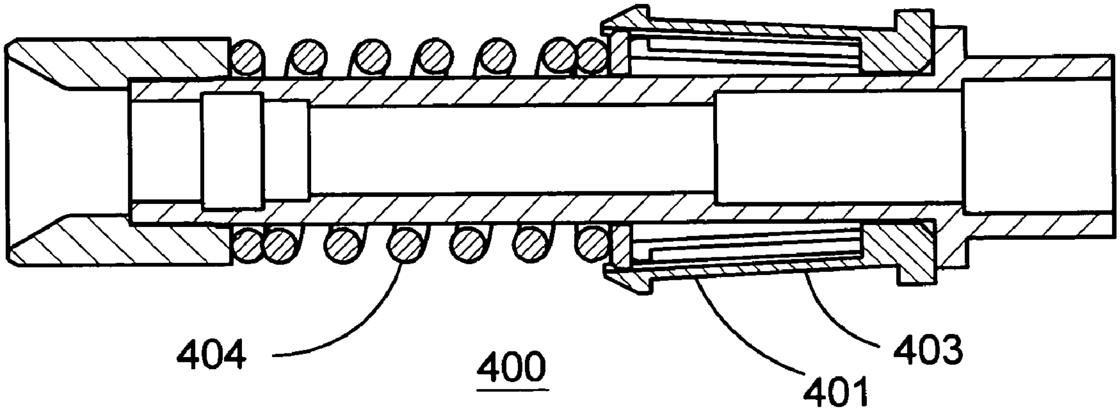
FIG. 6 PRIOR ART
FIG. 6 is a cross-sectional view through cut-line 5—5 of the second prior art connector of FIG. 4, showing the washer out of position.

For simplicity and clarity of illustration, the drawing figures illustrate the general manner of construction, and descriptions and details of well-known features and techniques are omitted to avoid unnecessarily obscuring the invention. Furthermore, elements in the drawing figures are not necessarily drawn to scale.

DETAILED DESCRIPTION OF THE PREFERRED EMBODIMENT

Figure 8:
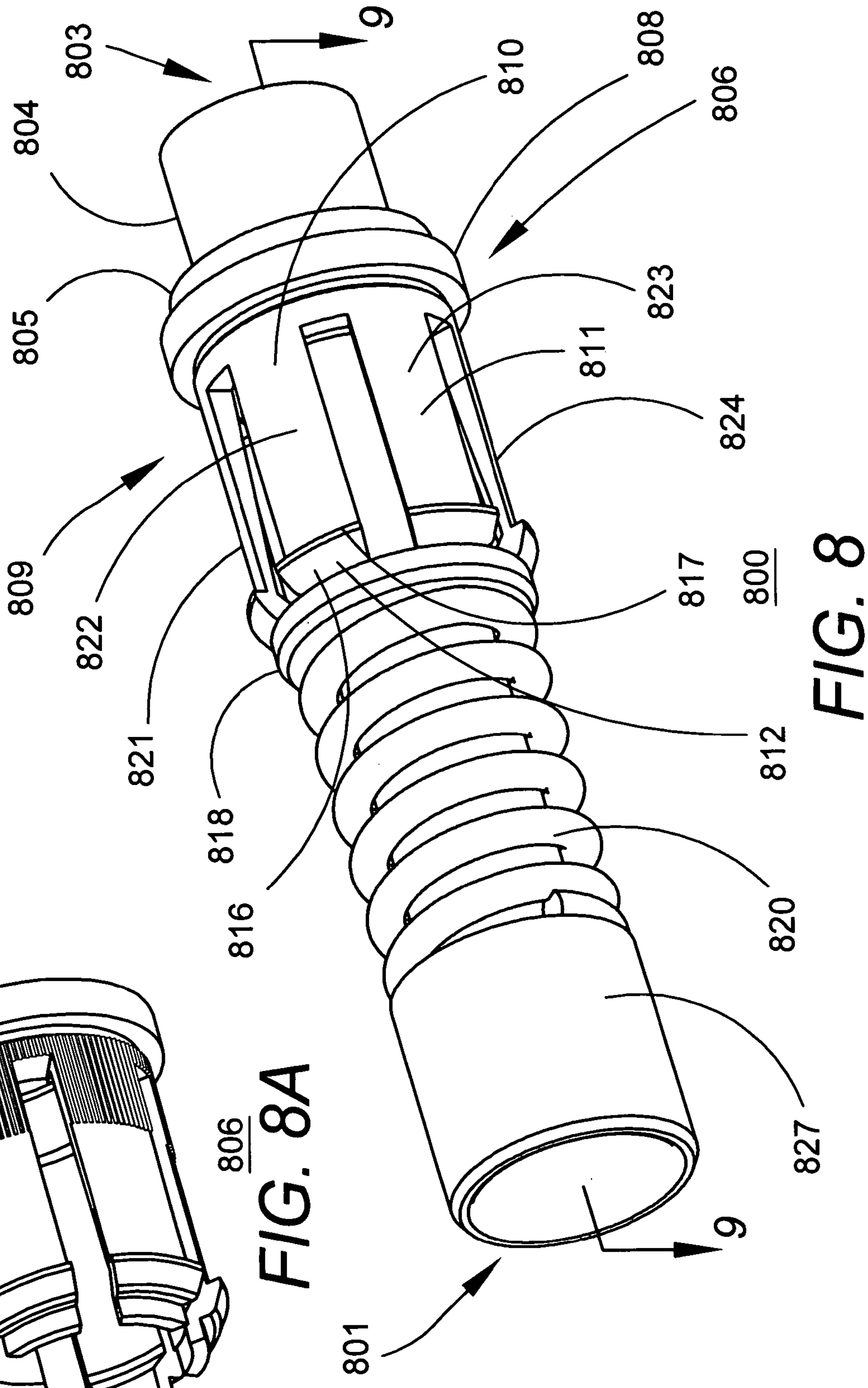
FIG. 8 is a perspective view of the connector in accordance with the invention, showing an embodiment of a spring finger basket.

An electrical connector, or connector, constructed in accordance with the invention is shown in FIGS. 8–17, and is generally designated by reference numeral 800. FIG. 8 is a perspective view of the connector 800, which is a male plug. The connector 800 is intended to be manually inserted into a mounting hole of a panel, such as the panel 701, and retained in the mounting hole by a press-fit. The panel 701 usually has a plurality of mounting holes (typically four to twenty). The connector has an interface end, or front end 801, and a cable end, or back end 803. A push-on style interface at the front end 801 of the connector 800 mates with a mating connector (not shown), which is a female jack. The back end 803 of the connector 800 accepts an end of a coaxial cable 1001 (see FIG. 10). The connector 800 comprises a body 804 having a shape of an elongate, approximately cylindrical shaped tube extending from the back end 803 to near the front end 801 of the connector 800. The body 804 has a flange 805 on an outer surface of the body.

Figure 8A:
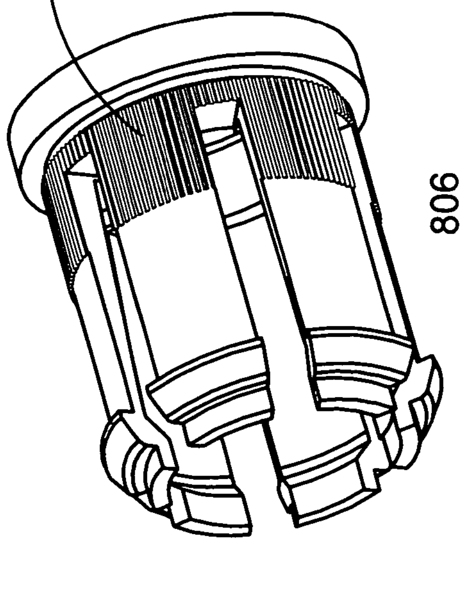
FIG. 8A is a perspective view of the spring finger basket, showing an alternate embodiment of the spring finger basket having knurls.

A spring finger basket 806 is mounted, preferably slip-fit mounted, around the outside of a portion of the body 804. The spring finger basket 806 has a base portion 808 that has an inner diameter slightly larger than the outer diameter of the portion of the body 804 on which it is mounted. Preferably, the base portion 808 is shaped as a continuous ring; alternatively, it is shaped as a C-ring. The base portion 808 abuts the flange 805, except during axial displacement. A plurality of integral spring fingers 809 emanates from the base portion 808 and extends axially from the base portion toward the front end 801 of the connector 800. The spring fingers of the plurality of spring fingers 809 are spaced, preferably equally, around the base portion 808. The spring finger basket 806 forms a generally cylindrical shape (interrupted by a slot between each spring finger) having an outer diameter larger than the diameter of the body 804. Each spring finger of the plurality of spring fingers 809 has a base 810 at the base portion 808 of the spring finger basket 806, an elongated middle portion 811 and a tip 812 at a front end opposite the base portion. The base 810 of each spring finger is radially inwardly recessed from the base portion 808 of the spring finger basket 806. Preferably, the spring finger basket 806 has six (6) spring fingers; however, either a greater number or a smaller number of spring fingers are foreseeable. Four (4) spring fingers 821–824 of the plurality of spring fingers 809 are at least partially visible in FIG. 8. Each spring finger of the plurality of spring fingers 809 has a ramp 816 near its tip 812. Each ramp 816 protrudes radially outwardly from the elongated middle portion 811 of the spring finger and forms a protrusion 817. A rear portion of an outer surface of the plurality of spring fingers 809 preferably is smooth if the panel 701 into which the connector 800 is to be inserted is metallic. The rear portion of the outer surface of the plurality of spring fingers 809 preferably has knurls if the panel 701 into which the connector 800 is to be inserted is nonmetallic. FIG. 8A is a perspective view of an alternate embodiment of the spring finger basket 806, in which the plurality of spring fingers 809 have knurls 828 on the rear portion of the outer surface. The body 804 has a body centerline 903 (see FIG. 9). In FIG. 8, the body centerline 903 is coincident with cut-line 9—9.

Figure 9:
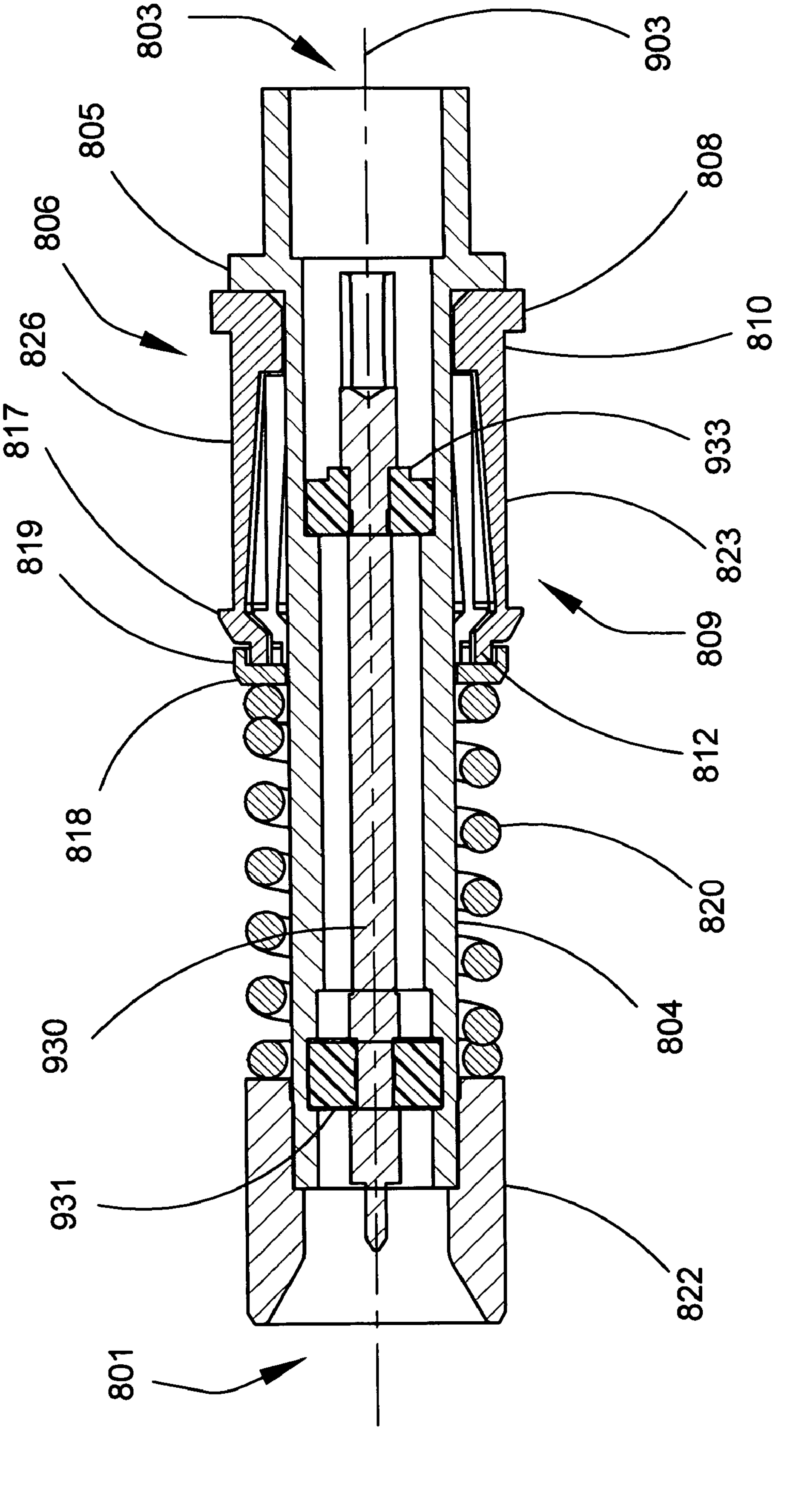
FIG. 9 is a cross-sectional view through cut-line 9—9 of the connector of FIG. 8.

Referring now to both FIG. 8 and FIG. 9, an end cap 818 is mounted to the body 804, preferably slip-fit mounted around the outside of the body, and preferably about midway between the front end 801 and the back end 803 of the connector 800. The end cap 818 has an inner diameter slightly larger than the outer diameter of the portion of the body 804 on which it is mounted. The end cap 818 has an outer lip 819 that extends toward the spring finger basket 806. The outer lip 819 of the end cap 818 defines an annular space 815 (see FIG. 14) proximate a back side of the end cap between the outer lip and the outer surface of the body 804. The tip 812 of each spring finger is a free end that is free to move radially within the annular space 815. The end cap 818 abuts the tip 812 of each spring finger. Advantageously, at all times, the tip 812 of each spring finger lies between the body 804 and the outer lip 819 of the end cap 818.

The connector 800 also comprises a spring, preferably a coil spring 820, mounted around the outside of the body 804. Preferably, the coil spring 820 is slip-fit mounted. A shroud 827 is attached to the body 804 near the front end 801 of the connector 800. Preferably, the shroud 827 is press-fit mounted to the body 804; alternatively, the shroud is mounted to the body by other means. As a further alternative, the shroud 827 is an integral part of the body 804. The shroud 827 retains the spring finger basket 806, the end cap 818 and the coil spring 820 on the body 804. Preferably, the spring finger basket 806, the end cap 818 and the coil spring 820 are rotatable on the body 804. A mounting mechanism of the connector 800 comprises the spring finger basket 806. The spring finger basket 806 has a centerline 1403 (see FIG. 14). In FIGS. 8–14 and 17, the centerline 1403 of the spring finger basket 806 is coincident with the body centerline 903. A central portion of the connector 800 is defined as the components of the connector that, when the connector is mounted to the mounting panel 701, can move axially and radially relative to the mounting panel, and includes the body 804 and all the other components of the connector except for the spring finger basket 806. As more fully explained hereinafter, the spring finger basket 806 cooperates with several components of the central portion of the connector 800 to allow temporary radial movement of the central portion relative to the panel 701 and to urge radial re-alignment of the central portion with a mating connector.

FIG. 9 is a cross-sectional view through cut-line 9—9 of the connector 800. A center contact 930 is mounted within the body 804 at the body centerline 903. The center contact 930 is held in place by a front insulator 931 and a back insulator 933. The tip 812 of each spring finger is specially shaped to interlock with the end cap 818 that serves to constrain the motion of the spring fingers, allowing the spring fingers to flex radially inward, but preventing the spring fingers from moving radially outward. The end cap 818 further serves to hold the body 804 centered within the spring finger basket 806 to prevent undesired misalignment. When the connector 800 is not installed in the mounting hole, as in FIG. 9, the tip 812 of each spring finger is sprung in close proximity to the outer lip 819 of the end cap 818, and the tip of each spring finger is spaced a first distance from the outer surface of the body 804, as result of a natural, or resting, position of the spring fingers.

Figure 10:
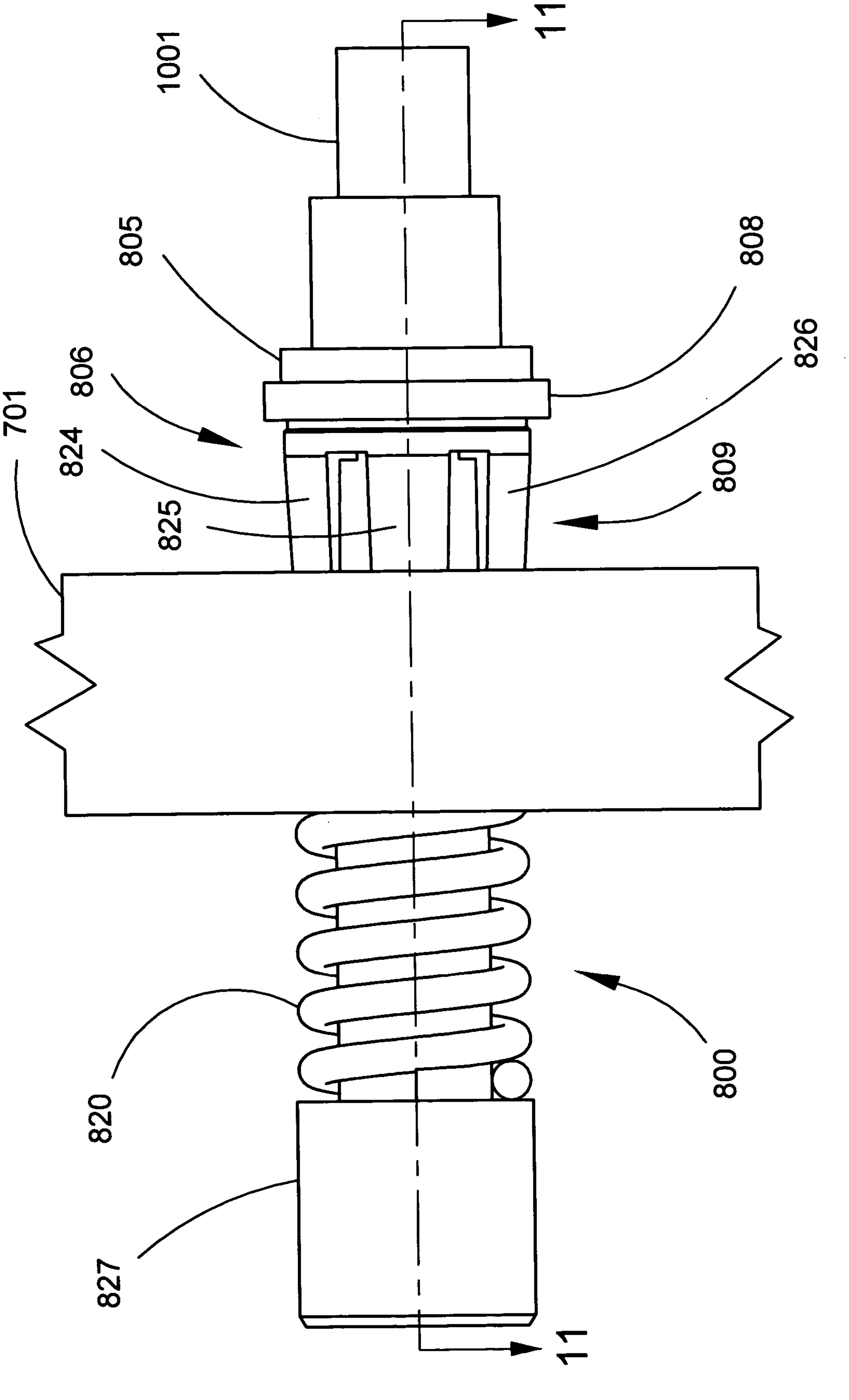
FIG. 10 is a side view of the connector of FIG. 8, a portion of a coaxial cable attached thereto and a portion of a panel, showing the connector in an intermediate position while being inserted into the panel.

FIG. 10 is a side view of the connector 800, a portion of a coaxial cable 1001 attached to the back end 803 of the connector 800, and a portion of the panel 701, and which shows the connector in an intermediate position while being inserted into a mounting hole of the panel. Three (3) spring fingers 824–826 of the plurality of spring fingers 809 are at least partially visible in FIG. 10. The mounting hole is circular, and preferably has a diameter of approximately 0.17-inch. The panel 701 preferably has a thickness of approximately 0.16-inch. The connector 800 is preferably sized to accept a coaxial cable 1001 of the 50-ohm, 0.086-inch, RG-405 semi-rigid type. Alternatively, the connector 800 is used with other sizes and types of mounting holes, mounting panels and coaxial cables, in which case the connector is sized accordingly.

Figure 11:
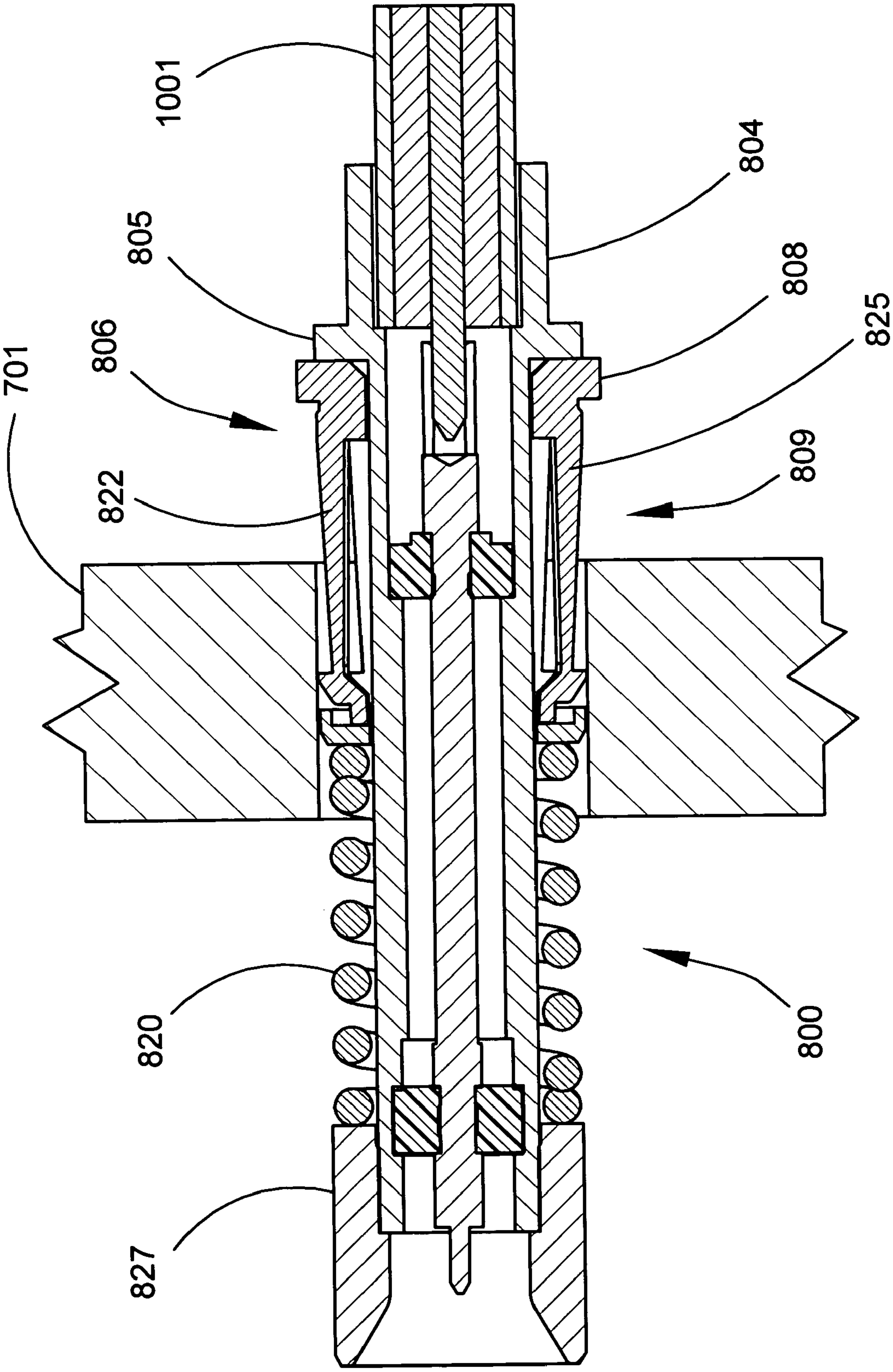
FIG. 11 is a cross-sectional view through cut-line 11—11 of FIG. 10, showing the connector in the intermediate position while being inserted into the panel.

FIG. 11 is a cross-sectional view through cut-line 11—11 of FIG. 10, which shows the connector 800 in the intermediate position while being inserted into the panel 701. In FIG. 11, spring fingers 822 and 825 appear in cross-section. A user inserts the connector 800 into the mounting hole, shroud end, or front end 801, first. The shroud 827, the coil spring 820 and the end cap 818 have outer diameters less than the diameter of the mounting hole. The shroud 827, the coil spring 820 and the end cap 818 preferably have outer diameters of less than or equal to 0.165-inch, which is less than the preferable minimum mounting hole diameter of 0.166-inch; therefore, the shroud, the coil spring and the end cap are able to pass through the mounting hole, preferable with little or no resistance. As insertion continues, the ramp 816 on each spring finger 821–826 encounters a surface defining the mounting hole, and continued insertion causes the resulting force to deflect the spring fingers radially inward to allow the connector 800 to slide through the mounting hole. Of course, in FIGS. 10 and 11, the spring fingers 821–826 are not in the natural, or resting, position. The connector 800 slides through the mounting hole until the base portion 808 of the spring finger basket 806 meets the panel 701. The base portion 808 prevents the connector 800 from sliding completely through the mounting hole because the base portion has an outer diameter greater than the diameter of the mounting hole. Preferably, the base portion 808 has an outer diameter of approximately 0.188-inch.

Figure 12:
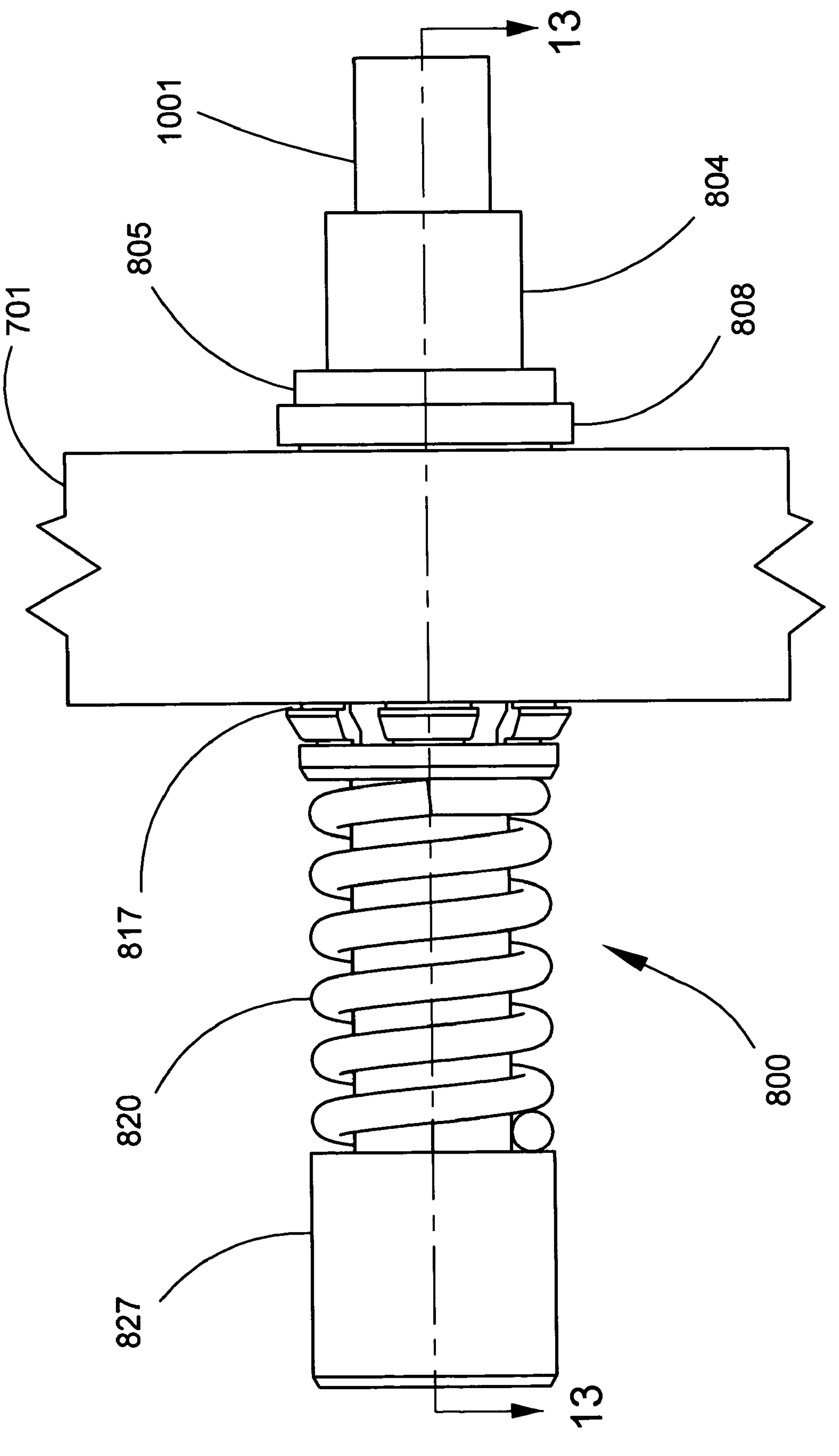
FIG. 12 is a side view of the connector of FIG. 8, a portion of a coaxial cable attached thereto and a portion of a panel, showing the connector mounted in the panel.

FIG. 12 is a side view of the connector 800, a portion of the coaxial cable 1001 attached thereto and a portion of the panel 701, and which shows the connector mounted in the panel.

Figure 7:
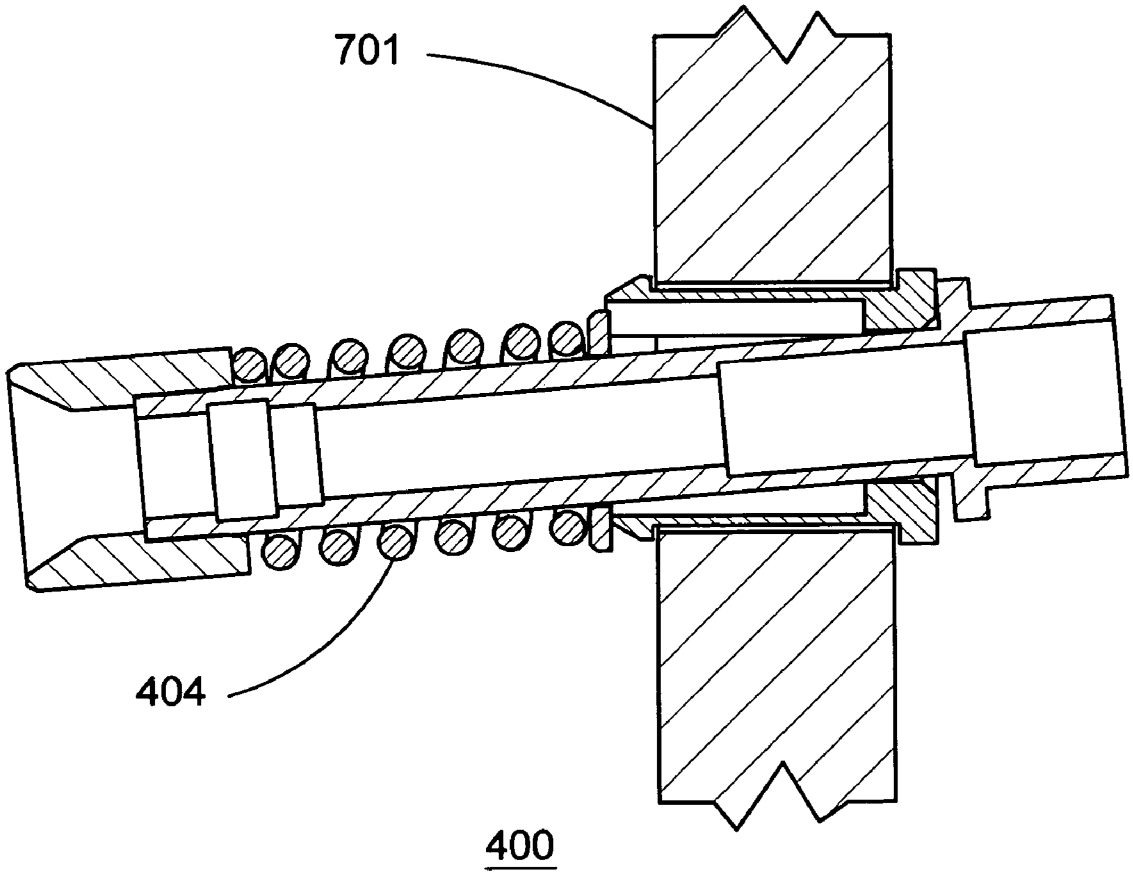
FIG. 7 PRIOR ART
FIG. 7 is a cross-sectional view through cut-line 5—5 of the second prior art connector of FIG. 4 showing a portion of a panel into which it is mounted, and showing the second prior art connector misaligned.
Figure 13:
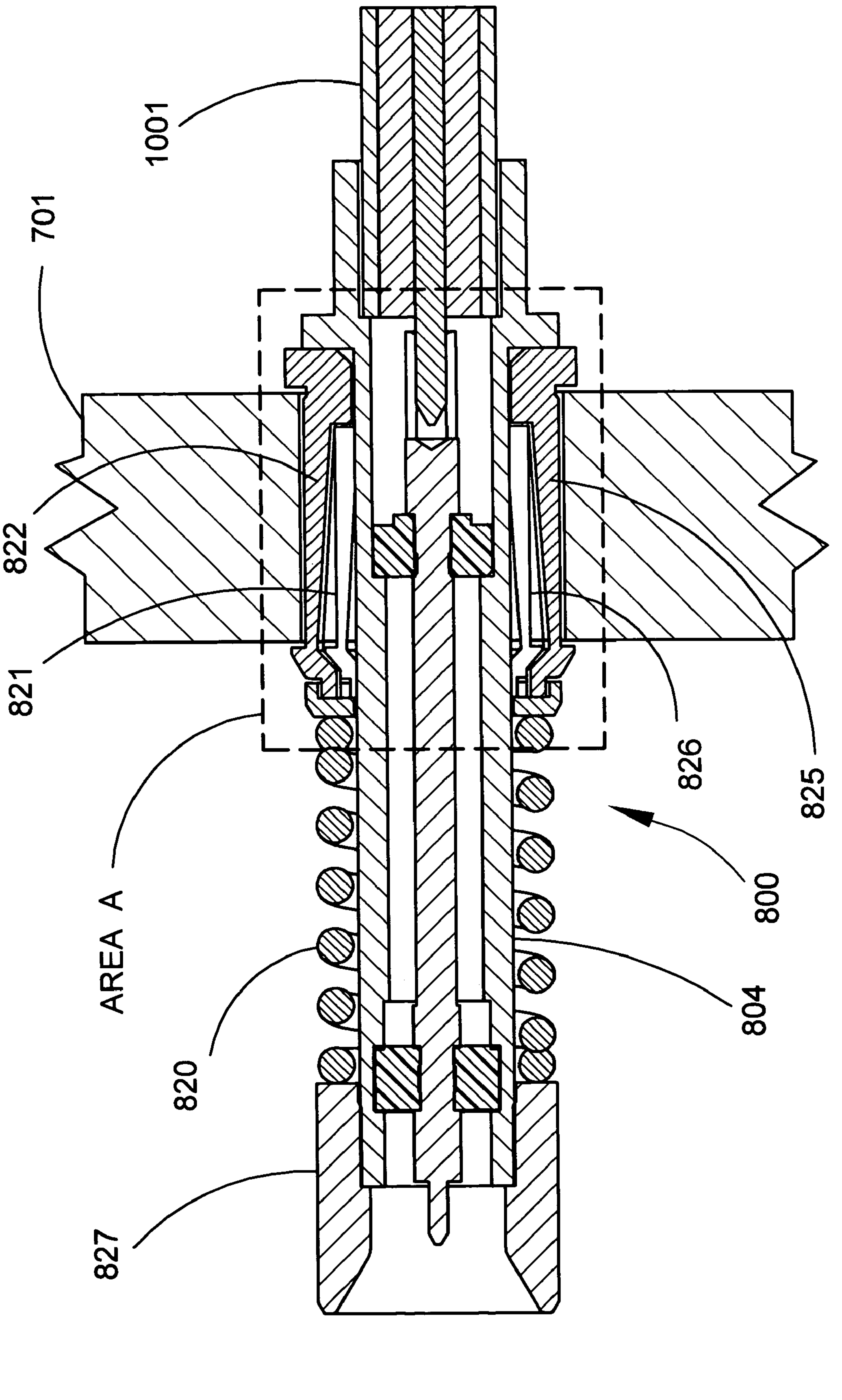
FIG. 13 is a cross-sectional view through cut-line 13—13 of FIG. 12, showing the connector mounted in the panel.
Figure 14:
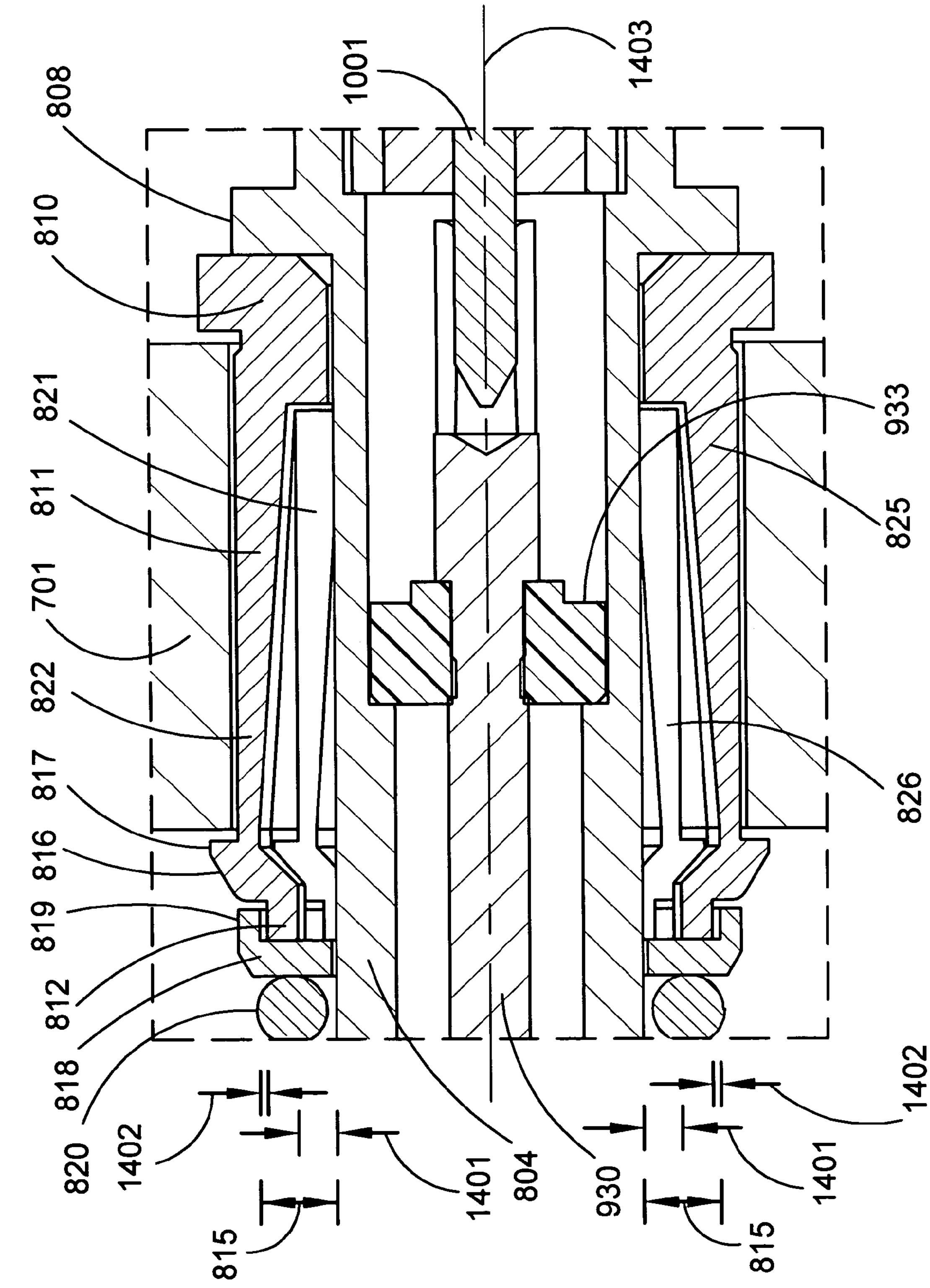
FIG. 14 is an enlarged view of Area A of FIG. 13.

FIG. 13 is a cross-sectional view through cut-line 13—13 of FIG. 12, which shows the connector 800 mounted in the panel 701, and which shows a portion of two spring fingers 821 and 826 (without crosshatch lines, as these fingers are not at cut-line 13—13). Once the connector 800 is fully inserted, the spring fingers 821–826 snap, or spring, radially outward, and the protrusions 817 near the tip of each spring finger lock the connector in the mounting hole. Once installed, an interlocking feature of the connector 800 causes the spring fingers 821–826 and the end cap 818 to act advantageously as a unit to keep the body 804 of the connector 800 centered in the mounting hole and to help prevent the misalignment problem of the second prior art connector 400, as shown in FIG. 7. In FIGS. 13 and 14, the connector 800 is perpendicular to the panel 701.

FIG. 14 is an enlarged view of Area A of FIG. 13, which shows in detail how the connector 800 advantageously uses an interlocking feature between the spring fingers 821–826 and the end cap 818. After the spring fingers 821–826 are sprung, the protrusions 817 near the tip 812 of each spring finger form an interrupted ring having an outer diameter greater than the diameter of the mounting hole, and preferably having an outer diameter of 0.182-inch. The end cap 818 is held in constant contact with the spring fingers 821–826 by the axial force of the coil spring 820. The interlocking feature helps to prevent the end cap 818 from being forced into the spring finger basket 806. The end cap 818 must have a small enough outer diameter to fit through the mounting hole, which requires the specific geometry at the end of each spring finger 821–826. Each spring finger 821–826 is preferably tapered, with a thicker cross-section near the base 810 and a thinner cross-section near the tip 812. Each spring finger 821–826 is tapered to more evenly distribute internal stress over the length of each spring finger, rather than concentrating the internal stress at the base 810 of the spring finger. Tapered spring fingers 821–826 help prevent breakage of the spring fingers, and help the connector 800 have maximum durability and reliability.

In FIGS. 13 and 14, the tip 812 of each spring finger 821–826 is equally spaced a first distance 1401 from the outer surface of the body 804 and equally spaced a second distance 1402 from the outer lip 819 of the end cap 818, as result of the sprung position of the spring fingers. The tips 812 of each spring finger 821–826 are equally spaced the distance 1401 from the body 804 only when the body centerline 903 is aligned with the centerline 1403 of the spring finger basket 806. Similarly, the tips 812 of each spring finger 821–826 are equally spaced the distance 1402 from the outer lip 819 of the end cap 818 only when the body centerline 903 is aligned with the centerline 1403 of the spring finger basket 806.

Figure 15:
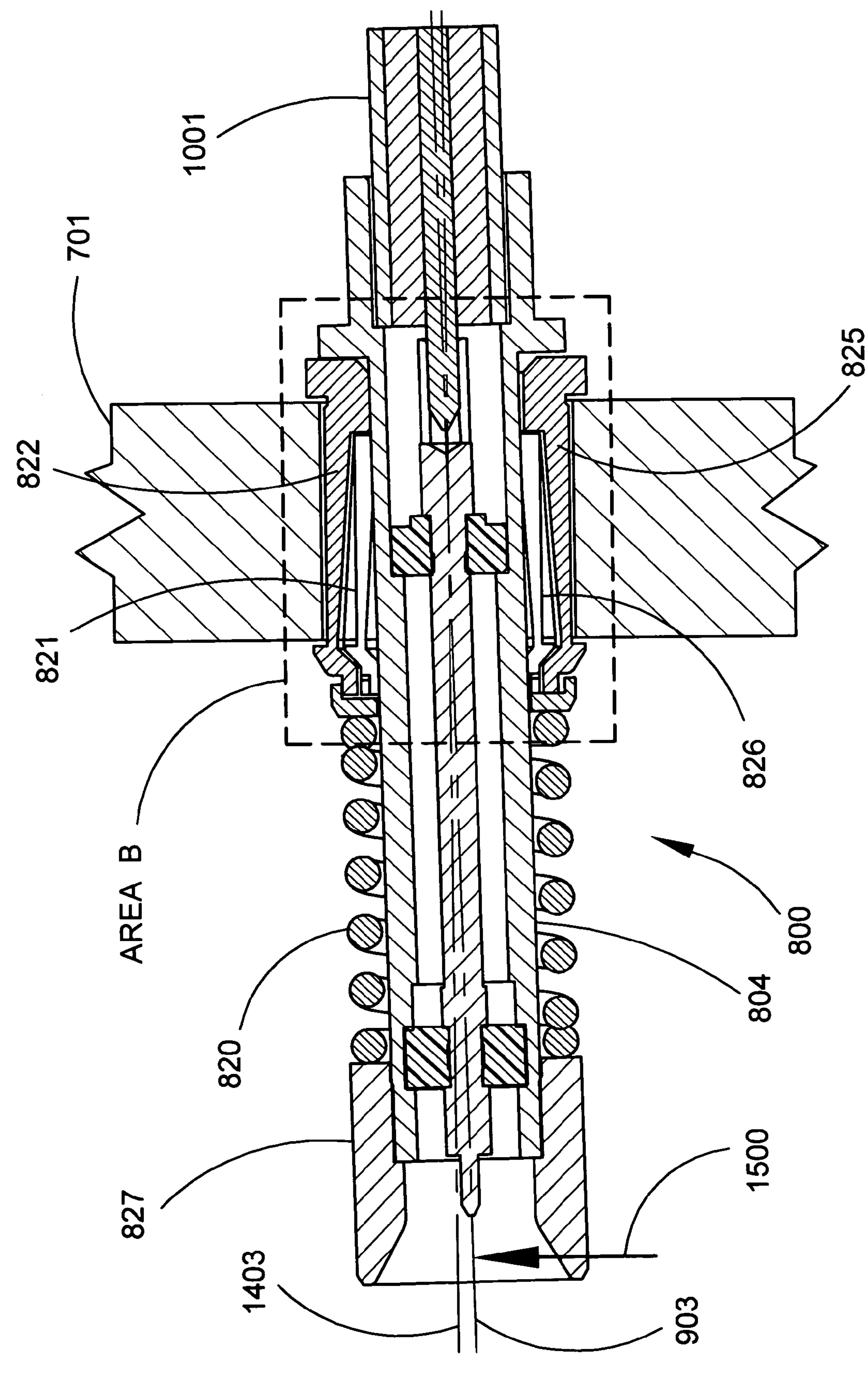
FIG. 15 is a cross-sectional view of the connector and a portion of the panel showing the connector mounted in the panel, and showing a central portion of the connector radially displaced.

FIG. 15 is a cross-sectional view of the connector 800 and a portion of the panel 701, which shows the connector mounted in the panel, and which shows a central portion of the connector radially displaced from an equilibrium position that is perpendicular to the panel. When a plurality of connectors 800 are installed in the panel 701, a build-up of tolerances in the connectors (and in the mating connectors) may cause the plurality of connectors to be misaligned with their respective mating connectors. Advantageously, the mounting mechanism of the connector 800 allows a limited amount of radial displacement of the central portion of the connector, in order to offset the build-up of tolerances. FIG. 15 shows the central portion of the connector 800 radially displaced to its full limit.

When the body 804 is radially displaced to a position that is not perpendicular to the panel 701, the tip 812 of at least one spring finger 825 moves toward the outer surface of the body 804 while the outer lip 819 of the end cap 818 constrains the outward radial movement of the tip of at least one other spring finger 822, which prevents large, but allows limited, axial movement of the connector 800. When the body centerline 903 is not coincident with the centerline 1403 of the spring finger basket 806, the tips 812 of one or more of the spring fingers are not equally spaced from the body 804. Similarly, when the body centerline 903 is not coincident with the centerline 1403 of the spring finger basket 806, the tips 812 of one or more of the spring fingers are not equally spaced from the outer lip 819 of the end cap 818, and, during an extreme radial misalignment, there might be no space at all between the tips of one or more spring fingers and the outer lip.

When the central portion of the connector 800 is radially displaced, the resiliency of the spring fingers 821–826, acting in cooperation with the outer lip 819 of the end cap 818 and with other components of the connector, move the central portion of the connector in the direction indicated by arrow 1500 to urge realignment of the body centerline 903 with the centerline 1403 of the spring finger basket 806.

Figure 16:
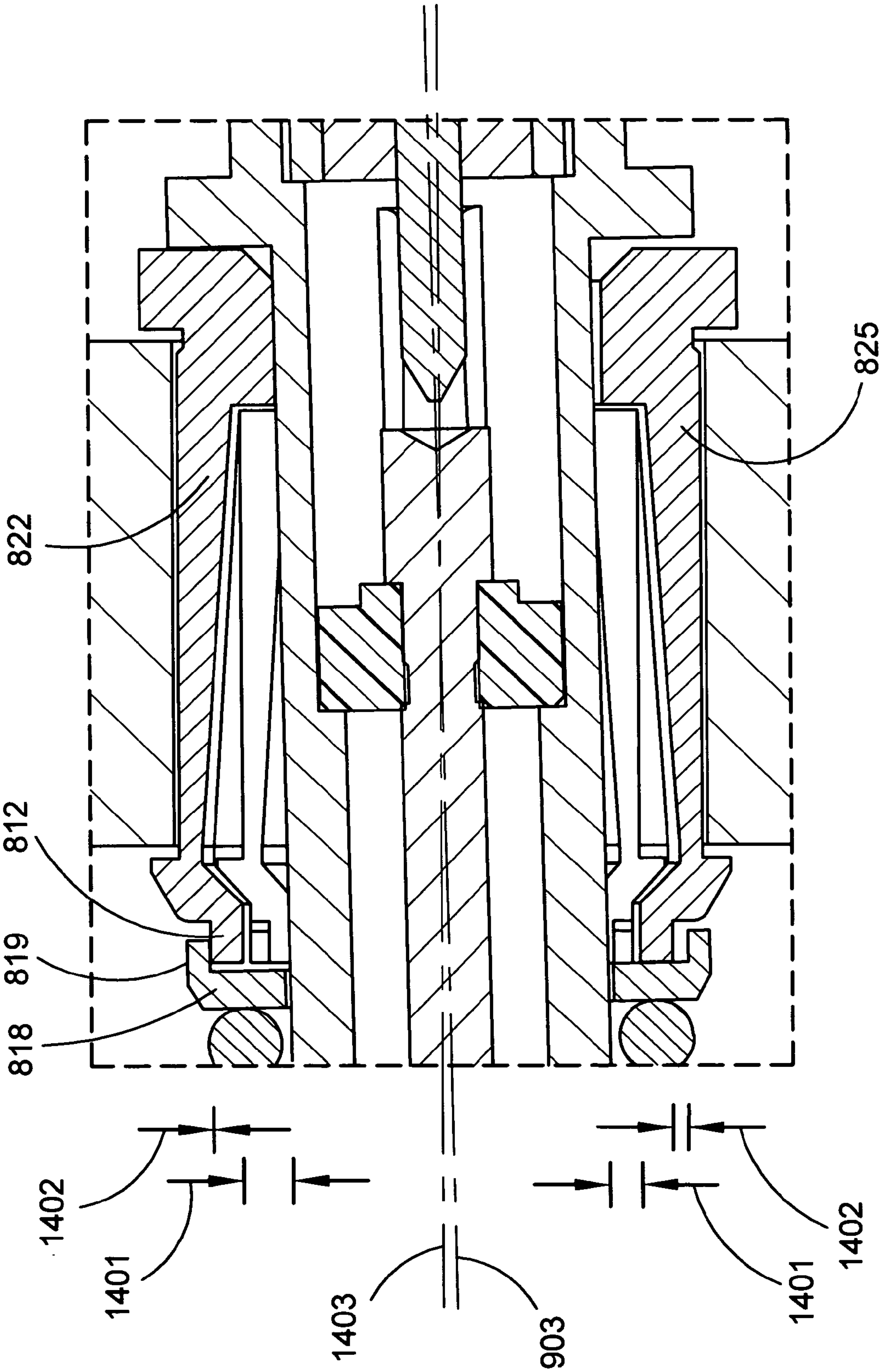
FIG. 16 is an enlarged view of Area B of FIG. 15.

FIG. 16 is an enlarged view of Area B of FIG. 15. Referring now to both FIGS. 14 and 16, the first distance 1401 at the tip of spring finger 822 is larger in FIG. 16 than in FIG. 14 because, in FIG. 16, the tip of spring finger 822 has moved away from the body 804. The first distance 1401 at the tip of spring finger 825 is smaller in FIG. 16 than in FIG. 14 because, in FIG. 16, the tip of spring finger 825 has moved toward the body 804. The second distance 1402 at the tip of spring finger 822 is smaller in FIG. 16 than in FIG. 14 because, in FIG. 16, the tip of spring finger 822 has moved away from the body 804. The second distance 1402 at the tip of spring finger 822 in FIG. 16 is approximately zero because the tip of spring finger 822 is in contact with the outer lip 819 of the end cap 818. The second distance 1402 at the tip of spring finger 825 is larger in FIG. 16 than in FIG. 14 because, in FIG. 16, the tip of spring finger 825 has moved toward the body 804.

The centerline 1403 of the spring finger basket 806 remains perpendicular to the panel 701 in spite of the central portion of the connector 800 being radially displaced to its full limit. The force exerted by the coil spring 404 on the spring finger basket 806 prevents the spring finger basket from being radially displaced when the body 804 is radially displaced, as shown in FIGS. 15 and 16. In the alternative embodiment of the spring finger basket 806 that has knurls 828, the knurls also help prevent the spring finger basket from being radially displaced when the body 804 is radially displaced.

Figure 17:
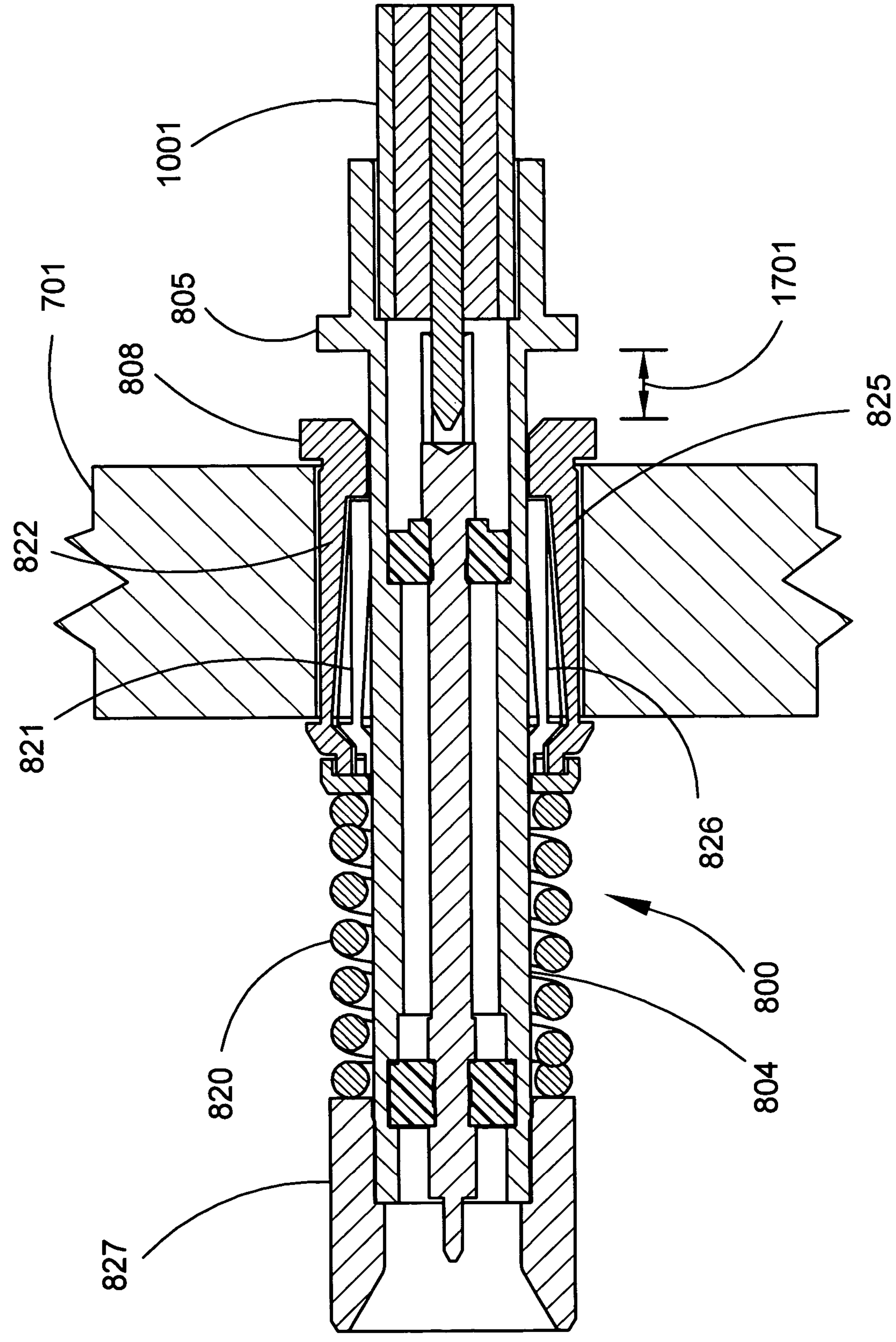
FIG. 17 is a cross-sectional view of the connector and a portion of the panel showing the connector mounted in the panel, and showing a central portion of the connector axially displaced.

FIG. 17 is a cross-sectional view of the connector 800 and a portion of the panel 701, which shows the connector mounted in the panel 701, and which shows the central portion of the connector axially displaced rearwardly from the equilibrium position. In the equilibrium position, the base portion 808 abuts the flange 805. As FIG. 17 does not depict the equilibrium position, the base portion 808 of the spring finger basket 806 does not abut the flange 805. In FIG. 17, the flange 805 has been moved rearwardly with respect to the panel 701 (typically as a result of the shroud 827 being moved rearwardly by an outside force), while the base portion 808 remains affixed to the panel, thereby producing an axial displacement 1701. A normal amount of axial displacement 1701 is approximately 0.040-inch. The central portion of the connector 800 can be axially displaced up to approximately 0.085-inch. The connector 800 allows simultaneous radial and axial movement of the body 804, when mounted in the mounting hole of the panel 701.

The body 804 and the center contact 930 are made of a conductive material, preferably metal, and more preferably beryllium copper. The shroud 827 is made of a conductive material, preferably metal, and more preferably stainless steel. The spring finger basket 806, the end cap 818, and the coil spring 820 can be made of either a conductive or a non-conductive material, and are preferably made of metal. More preferably, the spring finger basket 806 is made of beryllium copper, the end cap 818 is made of stainless steel and the coil spring 820 is made of zinc-plated music wire. The insulators 931 and 933 are dielectrics, preferably, virgin PTFE. The connector 800 is used at microwave radio frequencies up to 40-GHz in an SMP version, up to 65-GHz in an SMPM version and up to 100-GHz in a CGP, or G3PO, version. The connector 800 is easier to install and is more rugged and reliable than known prior art connectors.

Various modifications and changes may be made to the described embodiment by those skilled in the art without departing from the true spirit and scope of the invention as defined by the appended claims. For example, the mounting mechanism for the connector is not limited to use with connectors for coaxial cables, but can be used with connectors for any wires and with connectors for cables other than coaxial cables.

LIST OF REFERENCE NUMERALS

First prior art connector 100
C-shaped retaining ring 101
Groove 102
Ferrule 103
Second prior art connector 400
Prior art spring finger basket 401
Washer 402
Prior art spring fingers 403
Coil spring 404
Connector 800
Front end 801
Back end 803
Body 804
Flange 805
Spring finger basket 806
Base portion 808
Plurality of spring fingers 809
Base of spring finger 810
Elongated middle portion of spring finger 811
Tip of spring finger 812
Annular space 815
Ramp 816
Protrusion 817
End cap 818
Outer lip 819
Coil spring 820
Spring fingers 821–826
Shroud 827
Knurls 828
Body centerline 903
Center contact 930
Front insulator 931
Back insulator 933
Coaxial cable 1001
First distance 1401
Second distance 1402
Centerline of the spring finger basket 1403
Axial displacement 1701

What is claimed is:

1. An electrical connector for mounting in a mounting hole, the mounting hole having a diameter, comprising:
a body having a body axis; and
a mounting mechanism attached to the body, the mounting mechanism having a mounting mechanism axis and comprising,
a spring finger basket comprising a base portion and a plurality of spring fingers, each spring finger having a back end commonly connected at the base portion and a free front end opposite the base portion, the base portion being attached to an outer surface of the body adjacent to a flange in the outer surface, the free front end of each spring finger being spaced apart from the body,
an end cap attached to the body, a back side of the end cap being adjacent to the free front end of each spring finger, the end cap having a backward-extending outer lip limiting outward radial movement and permitting inward radial movement of the free front end of each spring finger during radial movement of the body with respect to the mounting mechanism, a spring attached to the body, a back side of the spring being adjacent to a front side of the end cap, and a shroud attached to the body adjacent to a front side of the spring.

2. The electrical connector of claim 1, including a ramp at the free front end of each spring finger to facilitate inward radial movement of the free front end of each spring finger during insertion of the electrical connector into the mounting hole.

3. The electrical connector of claim 1, wherein each spring finger of the plurality of spring fingers is integral with the base portion of the spring finger basket.

4. The electrical connector of claim 1, wherein the plurality of spring fingers of the spring finger basket have resiliency to return the body axis coincident with the mounting mechanism axis after a perturbation from being coincident.

5. The electrical connector of claim 1, in which the spring fingers are tapered, being thicker near the base portion and thinner near the free front end.

6. The electrical connector of claim 1, in which each spring finger has a protrusion near the free front end thereof, the protrusions of the plurality of spring fingers forming an interrupted ring having a protrusion diameter.

7. The electrical connector of claim 6, in which the interrupted ring formed by the protrusions near the free front end of each spring finger has a natural resting protrusion diameter greater than the diameter of the mounting hole.

8. The electrical connector of claim 7, in which the protrusion diameter reduces to less than the diameter of the mounting hole during insertion of the electrical connector into the mounting hole.

9. The electrical connector of claim 8, in which after complete insertion of the electrical connector into the mounting hole, the protrusion diameter returns toward its natural resting diameter, thereby locking the electrical connector in the mounting hole.

10. The electrical connector of claim 1, in which the body is axially movable relative to the mounting mechanism.

11. The electrical connector of claim 10, in which the mounting mechanism permits simultaneous radial and axial movement of the body relative to the mounting mechanism when the electrical connector is mounted in the mounting hole.

12. The electrical connector of claim 1, in which the spring is a coil spring coiled around the outer surface of the body.

13. The electrical connector of claim 12, in which the coil spring is rotatably attached to the outer surface of the body.

14. The electrical connector of claim 1, in which the mounting mechanism is slip-fit attached to the body.

15. The electrical connector of claim 1, in which the mounting mechanism is rotatably attached to the body.

16. The electrical connector of claim 1, in which the end cap is slip-fit attached to the outer surface of the body.

17. The electrical connector of claim 1, in which the end cap is rotatably attached to the body.

18. The electrical connector of claim 1, in which the shroud is press-fit attached to the outer surface of the body.

19. The electrical connector of claim 1, in which the shroud is integral with the body.

20. A mounting mechanism for mounting a body of an electrical connector in a mounting hole, the body having an axis, the mounting hole having a diameter, comprising:

a spring finger basket having an axis and comprising a base portion and a plurality of spring fingers, each spring finger having a back end commonly connected at the base portion and a tip at a front end opposite the base portion, the base portion being attached to an outer surface of the body adjacent to a flange in the outer surface, the tip of each spring finger being spaced apart from the body, an end cap attached the body, a back side of the end cap being adjacent to the free front end of each spring finger, the end cap having a backward-extending outer lip limiting outward radial movement and permitting inward radial movement of the tip of each spring finger during radial movement of the body with respect to the mounting mechanism, a spring attached to the body, a back side of the spring being adjacent to a front side of the end cap, and a shroud attached to the body adjacent to a front side of the spring.

21. The mounting mechanism of claim 20, wherein the body is movable relative to the spring finger basket.

22. The electrical connector of claim 20, in which the shroud is press-fit attached to the outer surface of the body.

23. The electrical connector of claim 20, in which the shroud is integral with the body.

24. An electrical connector for mounting in a mounting hole, the mounting hole having a diameter, comprising:

a body having an axis; and a mounting mechanism attached to the body, the mounting mechanism having an axis and comprising, a spring finger basket comprising a base portion and a plurality of spring fingers, each spring finger having a back end commonly connected at the base portion and having a tip at a front end opposite the base portion, the base portion being attached to an outer surface of the body adjacent to a flange in the outer surface, the tip of each spring finger being spaced apart from the body, an end cap attached to the body, a back side of the end cap being adjacent to the tip of each spring finger, the end cap having a backward-extending outer lip defining an annular space bounded by an inner surface of the outer lip, a back surface of the end cap and the outer surface of the body, within which the tip of each spring finger is free to move radially, a spring attached to the body, a back side of the spring being adjacent to a front side of the end cap, and a shroud attached to the body adjacent to a front side of the spring.

25. The electrical connector of claim 24, wherein the body is movable relative to the mounting mechanism.

26. The electrical connector of claim 25, wherein the body is axially movable relative to the mounting mechanism.

27. The electrical connector of claim 26, wherein the body is radially movable relative to the mounting mechanism.

28. The electrical connector of claim 25, wherein the body is radially movable relative to the mounting mechanism.

29. The electrical connector of claim 28, wherein the body is axially movable relative to the mounting mechanism.

30. The electrical connector of claim 24, in which the shroud is press-fit attached to the outer surface of the body.

31. The electrical connector of claim 24, in which the shroud is integral with the body.

* * * * *